United States Patent
Raveendran et al.

(10) Patent No.: US 7,995,849 B2
(45) Date of Patent: Aug. 9, 2011

(54) METHOD AND APPARATUS FOR IMPROVING VIDEO QUALITY OF LOW BIT-RATE VIDEO

(75) Inventors: Vijayalakshmi R. Raveendran, San Diego, CA (US); Ann Chris Irvine, Bonsall, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1370 days.

(21) Appl. No.: 10/802,285

(22) Filed: Mar. 16, 2004

(65) Prior Publication Data

US 2004/0208392 A1  Oct. 21, 2004

Related U.S. Application Data

(60) Provisional application No. 60/456,030, filed on Mar. 17, 2003.

(51) Int. Cl.
 G06K 9/48 (2006.01)
 G06K 9/40 (2006.01)
 H04N 7/12 (2006.01)
(52) U.S. Cl. ............. 382/248; 382/260; 375/240.29
(58) Field of Classification Search ........... 382/248
 See application file for complete search history.

(56) References Cited

U.S. PATENT DOCUMENTS

| | | | |
|---|---|---|---|
| 4,734,767 A | 3/1988 | Kaneko et al. | |
| 5,021,891 A | 6/1991 | Lee | |
| 5,107,345 A * | 4/1992 | Lee | 382/250 |
| 5,301,242 A | 4/1994 | Gonzales et al. | |
| 5,452,104 A * | 9/1995 | Lee | 358/426.14 |
| 5,515,388 A | 5/1996 | Yagasaki | |
| 5,657,085 A | 8/1997 | Katto | |
| 5,748,792 A * | 5/1998 | Wober | 382/250 |
| 5,903,669 A * | 5/1999 | Hirabayashi | 382/232 |
| 5,905,813 A | 5/1999 | Terane | |
| 5,982,434 A | 11/1999 | Tong et al. | |
| 5,982,441 A * | 11/1999 | Hurd et al. | 348/417.1 |
| 5,990,957 A | 11/1999 | Ryoo | |
| 6,031,937 A * | 2/2000 | Graffagnino | 382/236 |
| 6,094,631 A | 7/2000 | Li et al. | |
| 6,111,913 A | 8/2000 | Murdock et al. | |
| 6,188,799 B1 * | 2/2001 | Tan et al. | 382/260 |
| 6,240,135 B1 * | 5/2001 | Kim | 375/240.01 |
| 6,256,349 B1 | 7/2001 | Suzuki et al. | |
| 6,480,547 B1 | 11/2002 | Chen et al. | |

(Continued)

FOREIGN PATENT DOCUMENTS

EP    0711079    5/1996

(Continued)

OTHER PUBLICATIONS

International Search Report—PCT/US04/008287, International Search Authority—US, Aug. 17, 2004.

(Continued)

*Primary Examiner* — David P Zarka
(74) *Attorney, Agent, or Firm* — Kevin T. Cheathan

(57) ABSTRACT

Embodiments describe a method, apparatus and system for processing images using block based compression. In one embodiment, a method comprises determining whether two blocks are neighboring blocks, determining whether the two neighboring blocks are both subdivided, if the two blocks are neighboring blocks; performing deblocking filtering on one or more edge pixels of the two neighboring blocks, if it is determined that both of the two neighboring blocks are not subdivided.

37 Claims, 10 Drawing Sheets

U.S. PATENT DOCUMENTS

| | | | |
|---|---|---|---|
| 6,526,174 B1* | 2/2003 | Graffagnino | 382/236 |
| 6,529,634 B1* | 3/2003 | Thyagarajan et al. | 382/239 |
| 6,529,638 B1 | 3/2003 | Westerman | |
| 6,539,060 B1* | 3/2003 | Lee et al. | 375/240.29 |
| 6,560,370 B2 | 5/2003 | Ribas-Corbera et al. | |
| 6,665,346 B1 | 12/2003 | Lee et al. | 375/240.29 |
| 7,061,404 B2 | 6/2006 | Irvine et al. | |
| 7,130,310 B2 | 10/2006 | Itawaki et al. | |
| 7,227,998 B2 | 6/2007 | Nakayama et al. | |
| 2002/0044602 A1 | 4/2002 | Ohki | |
| 2002/0099853 A1 | 7/2002 | Tsujii et al. | |
| 2003/0044080 A1* | 3/2003 | Frishman et al. | 382/268 |
| 2003/0156648 A1* | 8/2003 | Holcomb et al. | 375/240.18 |
| 2003/0202608 A1* | 10/2003 | MacInnis et al. | 375/240.29 |
| 2003/0206664 A1 | 11/2003 | Gomila et al. | 382/268 |
| 2003/0235248 A1 | 12/2003 | Kim et al. | 375/240.12 |
| 2003/0235250 A1* | 12/2003 | Varma et al. | 375/240.29 |
| 2004/0096111 A1* | 5/2004 | Thyagarajan | 382/239 |
| 2004/0179608 A1 | 9/2004 | Holliman et al. | |
| 2005/0276505 A1 | 12/2005 | Raveendran | |

FOREIGN PATENT DOCUMENTS

| | | |
|---|---|---|
| JP | 03-066228 | 3/1991 |
| JP | 06233267 | 8/1994 |
| JP | 07-146927 | 6/1995 |
| JP | 08-023539 | 1/1996 |
| JP | 09-230894 | 9/1997 |
| JP | 10-336040 | 12/1998 |
| KR | 100244290 | 11/1999 |
| WO | 9113614 | 9/1991 |
| WO | 9959344 | 3/1999 |
| WO | 0128222 | 4/2001 |

OTHER PUBLICATIONS

Li, Jiankun, et al., "An Embedded DCT Approach to Progressive Image Compression," International Conference on Image Processing, vol. 1, Sep. 19, 1996, pp. 201-204.

European Search Reportt—EP0475761—European Search Authority—Munich—Jan. 27, 2010.

Le Maguet, "Low Complexity Deblocking", Joint Video Team (JVT) of ISO/IEC MPEG &ITU-T VCEG(ISO/IEC JTCI/SC29/WGII AND ITU-T SG16 Q6), XX, XX, No. JVT-C035, May 10, 2002, XP030005143.

Natan Peterfreund et al, "Text Modifications to MB-AFF Quantization and MB-AFF interaction with deblocking fllter",Joint Video Team (JVT) of ISO/IEC MPEG & ITU-T VCEG(ISO/IEC JTCI/SC29/WGII ANDITU-T SG16 06), XX, XX, No. JVT-EI62, Oct. 18, 2002, XP030005575.

"Text of ISO/IEC 14496-10 CD Advanced Video Coding",Joint Video Team (JVT) of ISO/IEC MPEG & ITU-T VCEG(ISO/IEC JTCI/SC29/WGII ANDITU-T SG16 06), XX, XX, No. N4810, May 14, 2002, XP030012280.

Vaisey J et al, "Image Compression With Variable Block Size Segmentation", A IEEE Transactions on Signal Processing, IEEE Service Center, New York, NY, US,vol. 40, No. 8, Aug. 1, 1992, pp. 2040-2060, XP000309977.

Wien, "16 bit Adaptive Blocksize Transforms", Joint Video Team (JVT) of ISO/IEC MPEG &ITU-T VCEG(ISO/IEC JTCI/SC29/WGII and ITU-T SG16 06), XX, XX, No. JVT-CI07rl-L, May 10, 2002, XP0300005217.

Goyal: "Multiple Description Coding: Compression Meets the Network," In Signal Processing Magazine, IEEE, vol. 18., Issue 5 (Sep. 2001) pp. 74-93 URL:http://www.rle.mit.edu/stir/documents/Goyal_SigProcMag2001_MD.pdf [Nov. 4, 2007].

Written Opinion—PCT/US2004/008287, International Search Authority, European Patent Office, Aug. 17, 2004.

* cited by examiner

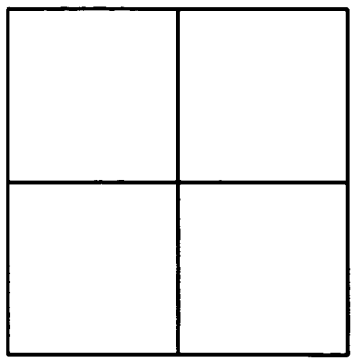
16 x 16 BLOCK
FIG. 4A
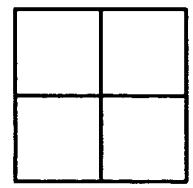
8 x 8 BLOCK
FIG. 4B
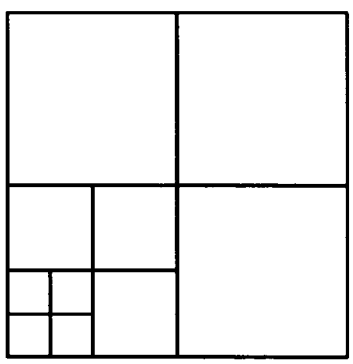
16 x 16 BLOCK
FIG. 4C
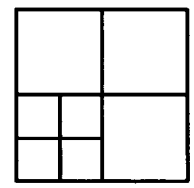
8 x 8 BLOCK
FIG. 4D
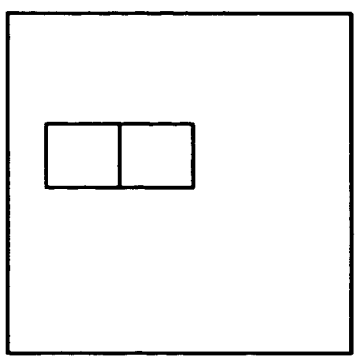
FIG. 5
| x3 | x2 | x1 | y1 | y2 | y3 |
|----|----|----|----|----|----|
|    |    |    |    |    |    |
$d_i = x_i - y_i$, $i = 1, 2, 3$
FIG. 13

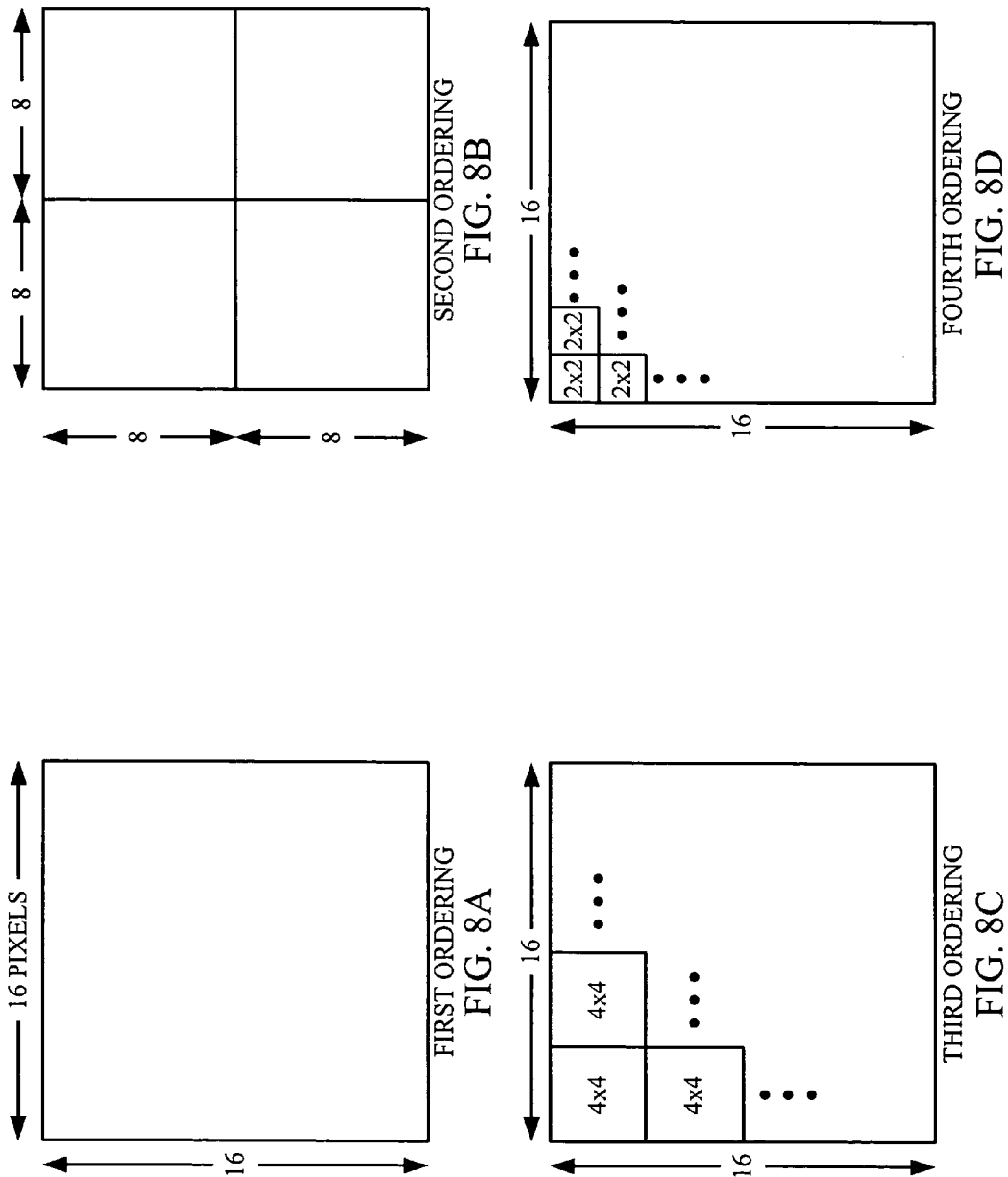

PQR = 0000 0100 1

PQR = 0000 1

PQR = 0

PQR = 0110 0000 0101 1

R = 0

R = 1

|  |  | VARIANCE THRESHOLDS (16x16, 8x8, 4x4) | | |
| --- | --- | --- | --- | --- |
| MEAN VALUE |  | Y | Cb | Cr |
| 0-70 | $T_{16}$<br>$T_8$<br>$T_4$ | 11<br>5<br>4 | 1118<br>2627<br>1266 | 2724<br>1680<br>457 |
| 71-100 | $T_{16}$<br>$T_8$<br>$T_4$ | 50<br>71<br>58 | 1388<br>446<br>128 | 629<br>2562<br>810 |
| 101-150 | $T_{16}$<br>$T_8$<br>$T_4$ | 344<br>1037<br>553 | 5405<br>4741<br>2044 | 7231<br>445<br>982 |
| 151-200 | $T_{16}$<br>$T_8$<br>$T_4$ | 1531<br>5278<br>2082 | 1000<br>307<br>211 | 642<br>690<br>180 |
| 201-300 | $T_{16}$<br>$T_8$<br>$T_4$ | 3644<br>13679<br>5499 | 12796<br>15389<br>18806 | 6039<br>5084<br>3874 |
| 301-400 | $T_{16}$<br>$T_8$<br>$T_4$ | 6439<br>25900<br>9319 | 17226<br>23978<br>20727 | 6374<br>5084<br>3422 |
| 401-500 | $T_{16}$<br>$T_8$<br>$T_4$ | 6918<br>27273<br>8786 | 2318<br>1299<br>282 | 2450<br>1602<br>775 |
| 501-600 | $T_{16}$<br>$T_8$<br>$T_4$ | 2000<br>19743<br>5226 | 2051<br>1076<br>2211 | 1271<br>661<br>230 |
| 601-700 | $T_{16}$<br>$T_8$<br>$T_4$ | 1080<br>5125<br>1015 | 7980<br>1631<br>1631 | 15062<br>1911<br>1911 |
| 701-800 | $T_{16}$<br>$T_8$<br>$T_4$ | 2725<br>14750<br>3731 | 35108<br>8415<br>12756 | 30063<br>19281<br>10165 |
| 801-900 | $T_{16}$<br>$T_8$<br>$T_4$ | 2171<br>6127<br>1940 | 44079<br>34443<br>15933 | 33059<br>2698<br>7407 |
| 901-1023 | $T_{16}$<br>$T_8$<br>$T_4$ | 416<br>1400<br>550 | 2726<br>1142<br>653 | 1546<br>392<br>85 |

FIG. 12

METHOD AND APPARATUS FOR IMPROVING VIDEO QUALITY OF LOW BIT-RATE VIDEO

CROSS-REFERENCE TO RELATED APPLICATIONS

The present Application for Patent claims priority to Provisional Application No. 60/456,030 entitled "Method and Apparatus for Improving Video Quality of Low Bit-Rate Video" filed Mar. 17, 2003, and assigned to the assignee hereof and hereby expressly incorporated by reference herein.

This patent application is related to the co-pending U.S. patent application Ser. Nos. 10/715,572 and 10/715,573, both entitled "System and Method for Multi-Description Encoding," filed on Nov. 17, 2003, and assigned to the assignee of the present invention.

BACKGROUND

I. Field of Invention

The invention generally relates to data compression and more particularly to block based compression systems.

II. Description of the Related Art

Transform coding is a common image compression technique that divides an image into sub-images or blocks for processing. Block-based compression introduces artifacts between block boundaries because blocks are independently coded. Therefore, the transform does not take into consideration the correlation between block boundaries. Accordingly, the technique typically results in low bit rate images that are heavily compressed, but contain severe compression artifacts such as blocking, ringing and motion smear.

As a result, several post-processing algorithms for deblocking have been proposed to reduce and/or eliminate compression artifacts. However, many involve complex computations and may result in an overall blurring effect on the output image. Other blocking filters do not conserve edge information effectively and are typically complex to implement in hardware. Accordingly, there is need for a more simple and/or effective deblocking process.

SUMMARY

A method and apparatus for processing images compressed using block based compression may comprise determining whether two blocks are neighboring blocks; determining whether the two neighboring blocks are both subdivided; performing deblocking filter on one or more edge pixels of the two neighboring blocks if both of the two neighboring blocks are not subdivided. Determining whether two neighboring blocks are both subdivided may comprise obtaining variance values of each of the two neighboring blocks; comparing the variance values to a first threshold; and determining whether the two neighboring blocks are both subdivided based upon the comparison of the variance values to the first threshold. Alternatively, determining whether two neighboring blocks are both subdivided also may also comprises obtaining a block size assignment value; and using the block size assignment value to determine whether the two neighboring values are subdivided.

The method and apparatus may further comprise determining whether one of the two neighboring blocks is subdivided, if both of the two neighboring blocks are not subdivided; using a first deblocking filter on one or more edge pixels of the two neighboring blocks if one of the two neighboring blocks is subdivided; and using a second deblocking filter on one or more edge pixels of the two neighboring blocks if neither of the two neighboring blocks are subdivided.

The method and apparatus may further comprise obtaining one or more difference values of one or more edge pixels of the two neighboring blocks, if neither of the two neighboring blocks are subdivided; comparing the one or more difference values to a second threshold; and selecting the second deblocking filter based on the comparison of the one or more difference values to the second threshold.

Obtaining one or more difference values may comprise obtaining difference values between three edge pixels of the two neighboring blocks; and selecting the second deblocking filter may comprise using a Gaussian filter if at least two of the difference values are greater than the second threshold.

BRIEF DESCRIPTION OF THE DRAWINGS

Various embodiments will be described in detail with reference to the following drawings in which like reference numerals refer to like elements, wherein:

FIGS. 4A to 4D show examples of block subdivision;

FIG. 5 show an example of two neighboring blocks in an image;

FIGS. 8A to 8D show the orderings of ABSDCT for a 16×16 block;

FIG. 12 is a table showing the different variance threshold values;

FIG. 13 shows some variable definitions; and

DETAILED DESCRIPTION

In compression systems using block based Discrete Cosine Transform (DCT), a data stream is divided into pixel blocks and discrete cosine transformed. This block based processing introduces blocking artifacts between block boundaries since the transform does not take into account the correlation between block boundaries and since each block is independently coded.

Typically, in compression systems using DCT, the size of each data block is fixed. However, there are dynamic image compression techniques capable of offering significant compression while preserving the quality of image signals utilizing adaptively sized blocks and sub-blocks of encoded DCT coefficient data. Such techniques will be called variable block size DCT. One example of variable block size DCT is the adaptive block size discrete cosine transform (ABSDCT) disclosed in U.S. Pat. No. 5,021,891, entitled "Adaptive Block Size Image Compression Method And System." DCT techniques are also disclosed in U.S. Pat. No. 5,107,345, entitled "Adaptive Block Size Image Compression Method And System," and the use of the ABSDCT technique in combination with a Discrete Quadtree Transform technique is discussed in U.S. Pat. No. 5,452,104, entitled "Adaptive Block Size Image Compression Method And System." The adaptive block sizes are chosen to exploit redundancy that exists for information within a frame of image data. ABSDCT will be described later in more detail.

The embodiments described below reduces artifacts by allowing a simple and effective deblocking process that can easily be implemented in compression systems using block based DCT. The embodiments are especially effective in variable block size DCT.

In the following description, specific details are given to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, structures and techniques may be shown in detail in order not to obscure the embodiments.

It is also noted that the embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 1:
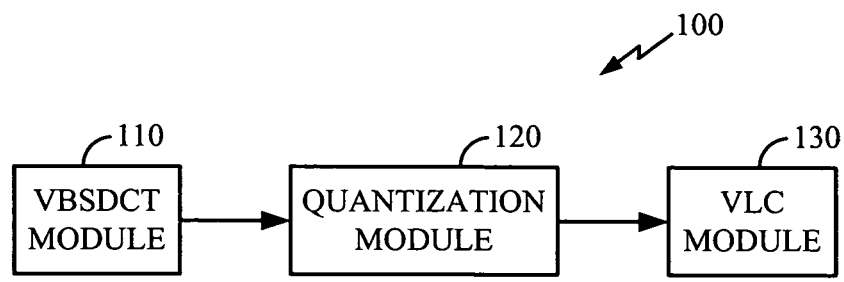
FIG. 1 is one example of an image compressor.
Figure 2:
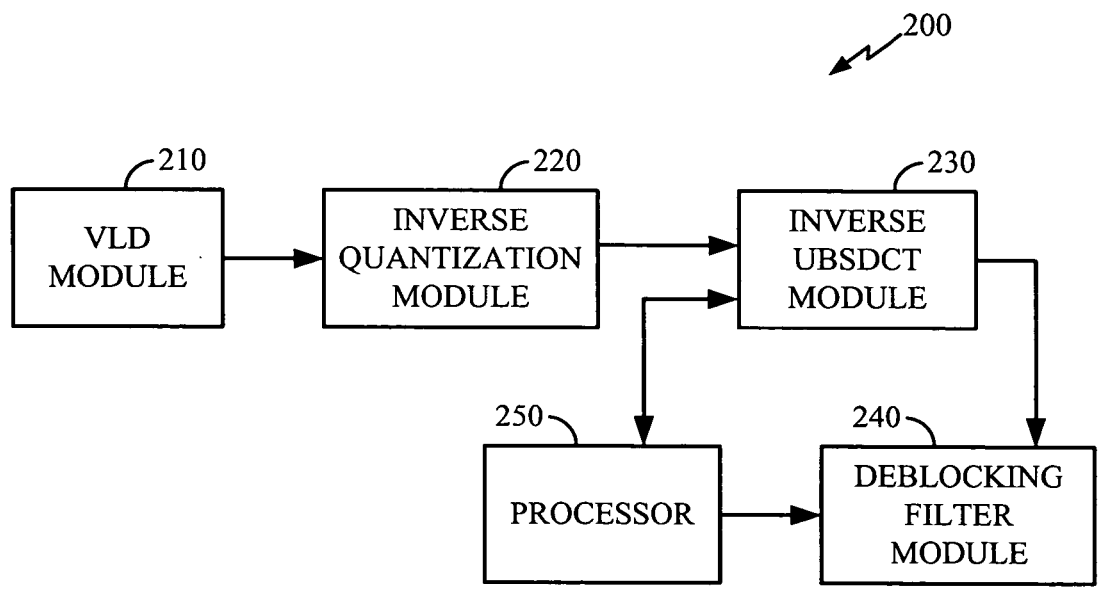
FIG. 2 is one example of an image decompressor.

FIG. 1 shows an example of an image compressor 100 and FIG. 2 shows an example of an image decompressor 200 that is symmetric to the image compressor 100. Image compressor 100 comprises a variable block size DCT (VBSDCT) module 110, a quantization module 120 and a variable length coding (VLC) module 130. Image decompressor 200 comprises a variable length decoding (VLD) module 210, an inverse quantization module 220 and an inverse VBSDCT module 230. Image decompressor 200 further comprises a deblocking filter module 240 to filter block edges when necessary and a processor 250 to control the deblocking filter module 240.

Typically, data stream input to image compressor 100 is composed of image frames. An image frame can generally be divided into slices, a slice can be divided into data blocks, and a data block can be divided into pixels which are the smallest units of an image. Each image frame includes an integer number of slices and each image slice represents the image information for a set of n consecutive scan lines, such as 16 consecutive scan lines. In such case, each data block corresponds to a 16×16 pixel block across the image of the frame. Also, a frame may be separated into even and odd slices, thereby forming even half frame and odd half frame. Moreover, an image pixel can be commonly represented in the Red, Green and Blue (RGB) color component system. However, because the human eye is more sensitive to changes in luminance and less sensitive to changes in chrominance, the YCbCr color space is typically used in video compression to represent image pixels. The YCbCr color space is a linear transformation of the RGB components, where Y is the chrominance component, and Cb and Cr are the color components. If a frame is separated into even/odd frames, an image frame would be made up of three even half frames and three odd half frames corresponding to the components Y, Cb and Cr.

In the description above, a slice can represent a set of consecutive scan lines other than 16 consecutive scan lines. Also, the data block may be an n×m block, where n is not equal to m, if the block can be subdivided Moreover, a different color space with the same or different number of color components may be used to represent an image pixel. However, a block size of 16×16 pixels and the YCbCr color space will be used below for purposes of explanation.

Figure 3:
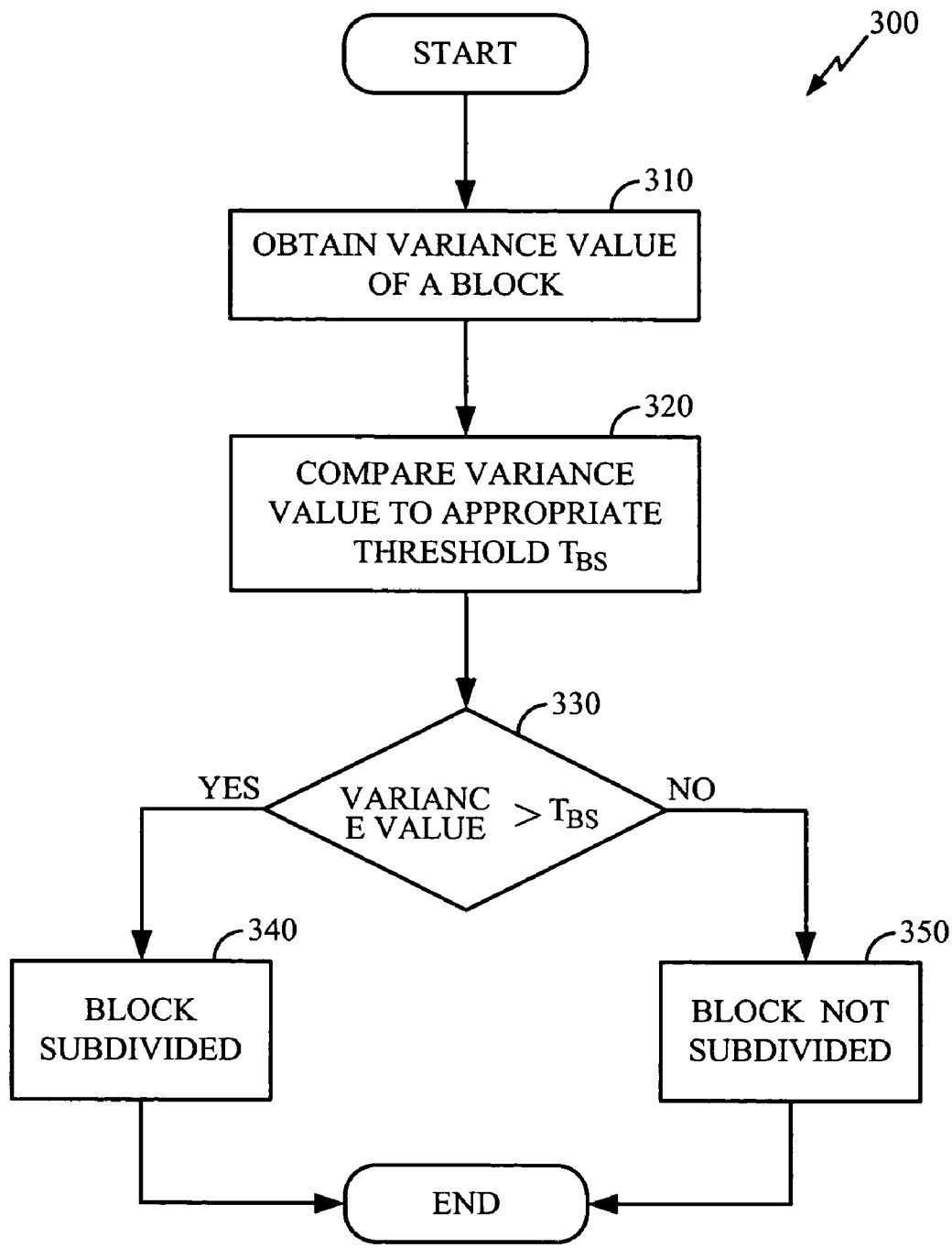
FIG. 3 shows an example process for determining whether a block is subdivided.

Referring back to FIG. 1, VBSDCT module 110 converts the digital image information from spatial to frequency domain and generates DCT coefficients with corresponding block size assignment (BSA) information. VBSDCT module 110 divides and processes the digital image information in blocks and sub-blocks as necessary. FIG. 3 shows one process 300 to determine whether a block is subdivided. In process 300, the variance value of a DCT block is obtained (310). The variance is then compared to a threshold value TBS set for the size of the block (320). A determination is made whether the block is subdivided based upon the comparison of the variance value to the threshold TBS. Namely, if the variance value is greater than TBS, then the block is subdivided (330 and 340). Otherwise, the block is not subdivided (350). Here, an analogous process may be used on a sub-block to determine whether the sub-block is subdivided. In such case, the variance would be compared to a threshold value set for the size of the sub-block.

The BSA information indicates how a block is subdivided, if a block is divided. For example, the BSA information may indicate that a 16×16 block is subdivided into four 8×8 blocks as in FIG. 4A or perhaps that an 8×8 block is subdivided into four 4×4 blocks as in FIG. 4B. In other systems, the BSA information may indicate that a 16×16 block is subdivided into four 8×8 blocks as shown in FIG. 4C. As shown, one of the 8×8 block of FIG. 4C is subdivided into four 4×4 blocks and further into four 2×2 blocks as also shown in FIG. 4C, based on the system configuration and/or needs. Quantization module 120 then quantizes the DCT coefficients and VLC 130 compresses the quantized DCT coefficients using a variable length coding technique.

At image decompressor 200, VLD module 210 decompresses compressed image information, quantization module 220 inverse quantizes the decompressed image information and inverse VBSDCT module 230 converts the inverse quantized image information from frequency to spatial domain, using the block size assignment information. Processor 250 determines whether two blocks of the image are neighboring blocks as shown in FIG. 5. Processor 250 then determines whether deblocking is necessary for the two neighboring blocks based on the amount of block edge activity or busyness. If deblocking is deemed necessary, one or more common edge pixels of the two neighboring blocks are filtered by deblocking filter module 240. The post-processed image information is then output to a display and/or stored for presentation.

Figure 6:
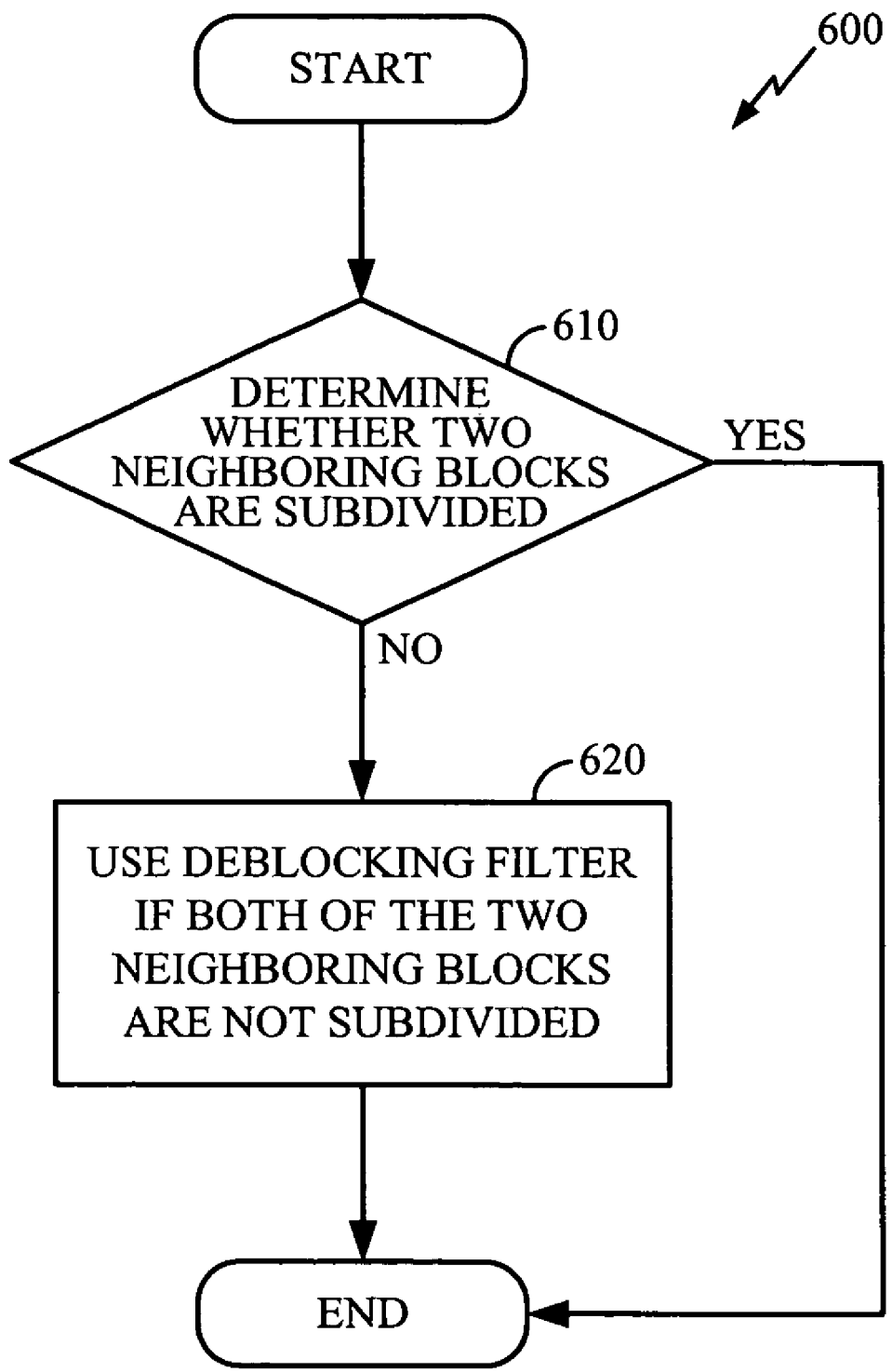
FIG. 6 shows an example process for determining whether to use deblocking filter.

FIG. 6 shows one process 600 for processing images compressed using block based compression. In process 600, a determination is made whether two neighboring blocks are both subdivided (610). Here, the BSA information may be used to determine whether the two neighboring blocks are subdivided. If both of the two neighboring blocks are not subdivided, then deblocking filter is used on one or more edge pixels of the two neighboring blocks (620).

Figure 7:
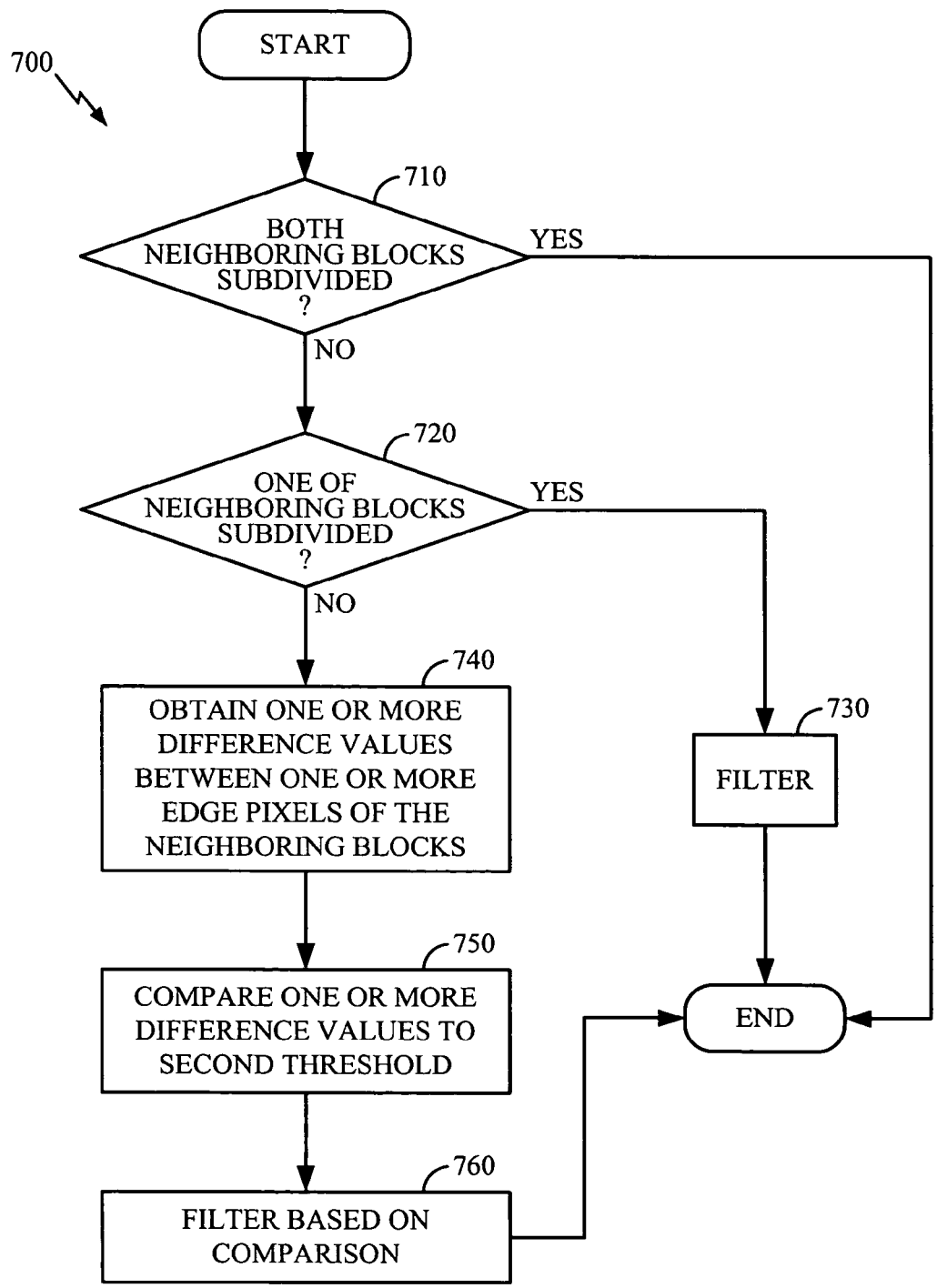
FIG. 7 shows another example process for determining whether to use deblocking filter.
Figure 10B:
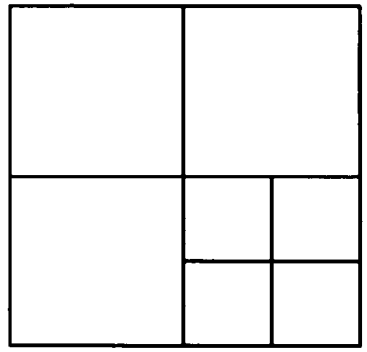
FIGS. 10A to 10D show more examples of block size assignment data.
Figure 10D:
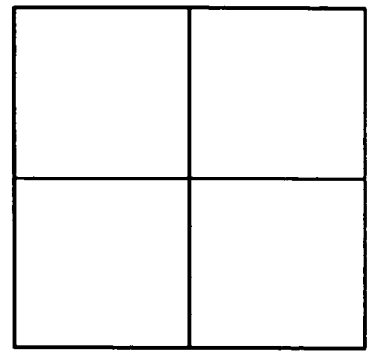
Figure 10A:
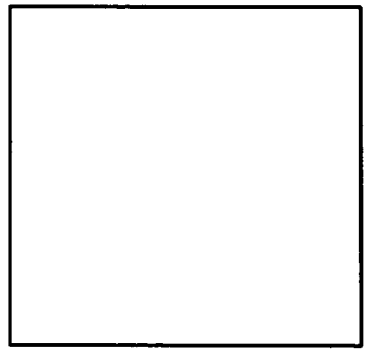
Figure 10C:
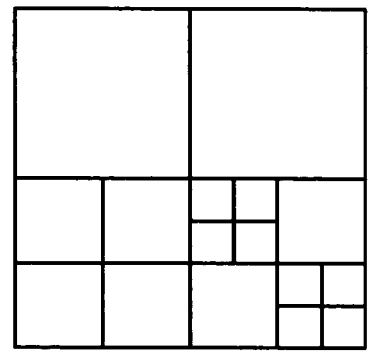

FIG. 7 shows another process 700 for processing images compressed using block based compression. In process 700, a determination is made whether two neighboring blocks are both subdivided (710). If determined that the two neighboring blocks are both subdivided, deblocking filter is not used. However, if both of the two neighboring blocks are not subdivided, i.e. at least one of the two neighboring blocks is not subdivided, a further determination is made whether one of the two neighboring blocks is subdivided (720). If one of the two neighboring blocks is subdivided, then a first deblocking filter is used on one or more pixels of the two neighboring blocks (730). Here, the first deblocking filter may be a two point averaging filter used on two edge pixels of the two neighboring blocks. If neither of the two neighboring blocks are subdivided, then a second deblocking filter is used on one or more pixels of the two neighboring blocks.

More particularly, difference values between one or more corresponding edge pixels of the two neighboring blocks are obtained (740). A difference value represents the variance across a block boundary and may be obtained and/or derived using various techniques. A simple first order difference between two corresponding edge pixels of two neighboring blocks may be obtained. In other embodiments, a second order difference may be obtained and used. The one or more difference values are compared to a threshold TD (750). Based on the comparison of the one or more difference values to the threshold TD, the second deblocking filter is selected (760).

The threshold TD generally depends on the luminance and can be set for ahead of time for different systems and/or different types of images. In one embodiment, the average of the mean values of the two neighboring blocks may be used as the threshold TD. Alternatively, the threshold TD may be the difference in the mean values of the two neighboring blocks. The threshold TD may also be optimized to deal with intensity variations in an image using a scale factor α which is proportional to the contrast ratio defined as follows, where μc is the mean values of the current block and μn is the mean of a block containing the edge pixels used in obtaining the difference values.

$$\alpha = (|\mu_c - \mu_n|)/\mu_n$$

The value of α ranges from 0 to 1.

Furthermore, in one embodiment, the difference values between three edge pixels of the two neighboring blocks are obtained and compared with threshold TD. If at least two of the difference values are greater than TD, a Gaussian filter is selected. Namely, if three of the three difference values are greater than TD, a six point Gaussian filter is used on six edge pixels of the two neighboring blocks. If two of the three difference values are greater than TD, then a four point Gaussian filter is used on four edge pixels of the two neighboring blocks. If one of the three difference values is greater than TD, an averaging filter is used on two edge pixels of the two neighboring blocks.

Referring back to FIG. 2, processor 250 can therefore determine whether deblocking is necessary. As discussed above, processor 250 can also select, as the system allows, different deblocking filters depending on the characteristics of the neighboring blocks. Thus, the deblocking filter module 240 may include one or more types of filters such as, but not limited to, an averaging filter and/or Gaussian filter.

Furthermore, as discussed above, VBSDCT module 110 may be implemented by ABSDCT. Compression techniques using ABSDCT will next be described using a block size of 16×16 pixels. Generally, each of the luminance and chrominance components is passed to a block interleaver (not shown). In one embodiment as shown in FIGS. 8A to 8D, a 16×16 block is presented to the block interleaver, which orders the image samples within the 16×16 blocks to produce blocks and composite sub-blocks of data for DCT analysis. One 16×16 DCT is applied to a first ordering, four 8×8 DCTs are applied to a second ordering, 16 4×4 DCTs are applied to a third ordering, and 64 2×2 DCTs are applied to a fourth ordering. The DCT operation reduces the spatial redundancy inherent in the image source. After the DCT is performed, most of the image signal energy tends to be concentrated in a few DCT coefficients.

For the 16×16 block and each sub-block, the transformed coefficients are analyzed to determine the number of bits required to encode the block or sub-block. Then, the block or the combination of sub-blocks that requires the least number of bits to encode is chosen to represent the image segment. For example, two 8×8 sub-blocks, six 4×4 sub-blocks, and eight 2×2 sub-blocks may be chosen to represent the image segment. The chosen block or combination of sub-blocks is then properly arranged in order.

Figure 9A:
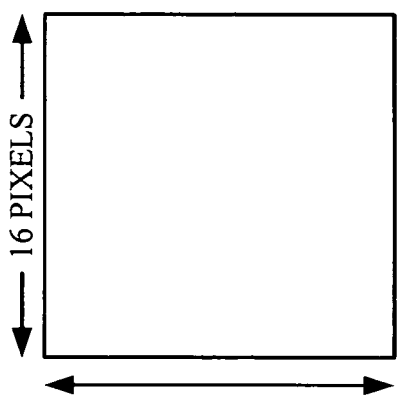
FIGS. 9A and 9B show examples of block size assignment data.
Figure 9B:
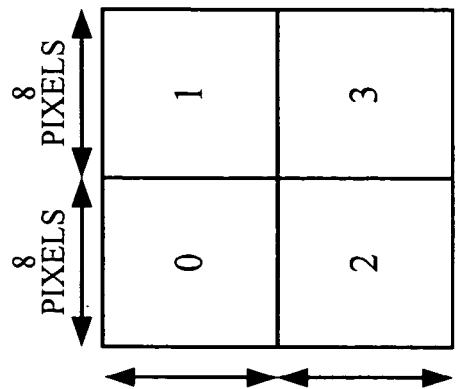

The transformed coefficients are analyzed and the block or the combination of sub-blocks to represent the image segment is selected. Thus, the block size assignment information that represents the block size assignment within an n×n block is generated. For the 16×16 data block, ABSDCT technique generates data known as PQR information that represents the block size assignment within the 16×16 block. The PQR information is a variable bit width data and describes to what extent a 16×16 block is subdivided. The R-bit of the PQR field represents whether the 16×16 block is subdivided into four 8×8 blocks. As shown in FIG. 9A, if the R bit is '0', the block remains whole. In this case no further PQR information is needed and the PQR field is only 1 bit long. If the R bit is '1', then the 16×16 block is subdivided into four 8×8 blocks as shown in FIG. 9B, and at least four additional bits will exist in the PQR field.

The additional four bits are referred to as 'Q' information. Each bit of Q denotes a subdivision of an 8×8 block into four 4×4 blocks. For each bit of Q that is set, four more bits of 'P' are present to indicate if any of the 4×4 blocks are subdivided into 2×2. Accordingly, the length of PQR data can be 1 to 21 bits long, depending on the block size assignment within the 16×16 block. If every 8×8 block is subdivided, then the PQR information will be 21 bits in length. FIGS. 10A-D shows some examples of the 16×16 blocks with corresponding PQR data.

Accordingly, each block may be divided into sub-blocks of sizes 8×8, 4×4, and or 2×2 depending on the assignment criterion. The criterion to subdivide an n×n block is the block variance as follows.

$$\text{Block\_variance} = \frac{1}{N^2} \sum_{m=0}^{N-1} \sum_{n=0}^{N-1} x^2(m, n) - \left[\frac{1}{N} \sum_{m=0}^{N-1} \sum_{n=0}^{N-1} x(m, n)\right]^2$$

An n×n block of pixels shall be subdivided into 4 n/2×n/2 sub-blocks if the block variance of the n×n block exceeds a certain threshold. Here, the block mean can have values in the range (0, 1023) for a 10-bit image. Thus, the image is divided into 12 bins and a set of thresholds is used for each bin for each color component. Also, the thresholds may be determined based on the statistics collected from a number of image frames of different types. A typical threshold set is shown in FIGS. 12A-C.

Figure 11:
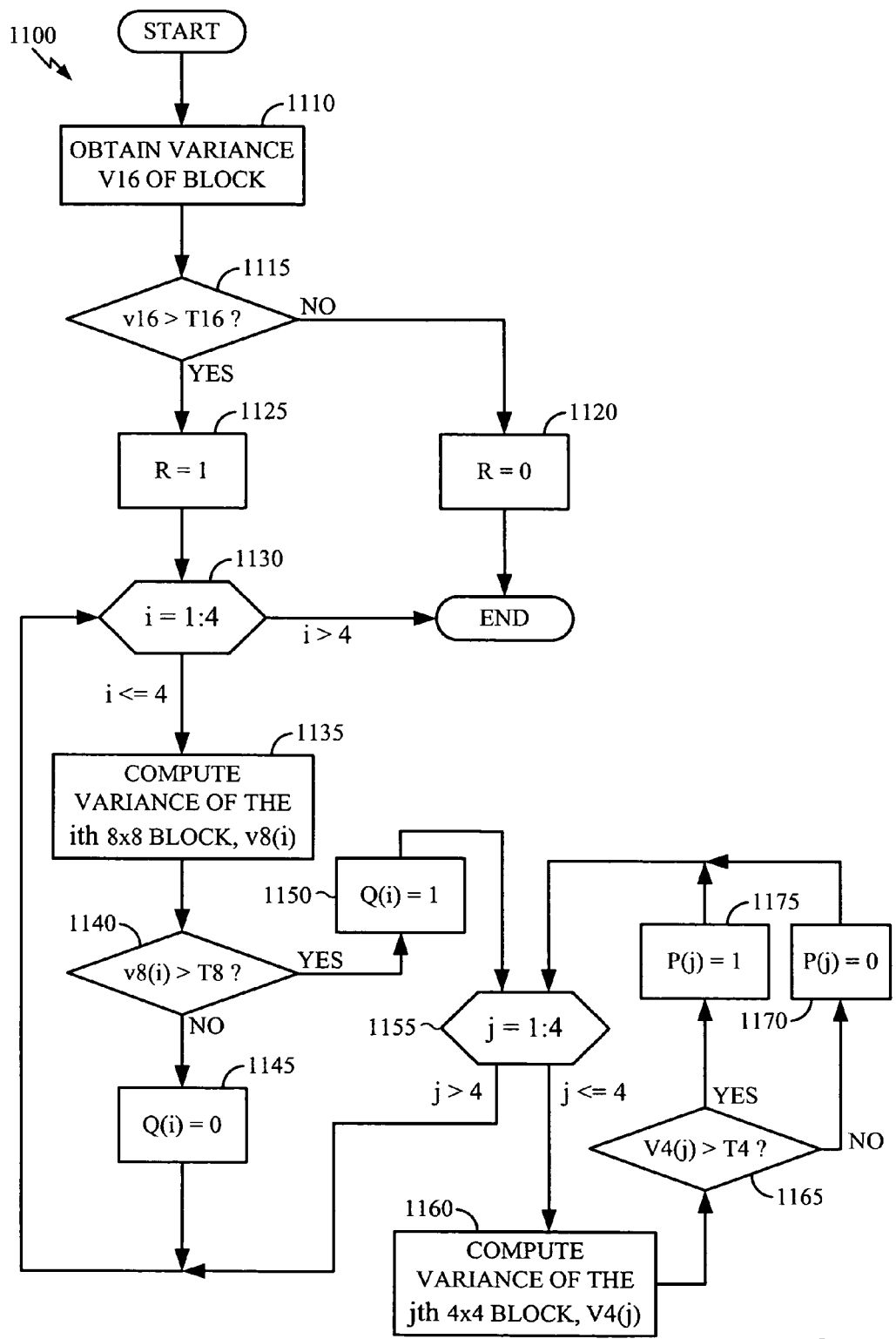
FIG. 11 shows an example process for generating block size assignment data for ABSDCT.

FIG. 11 illustrates an example process 1100 for generating the PQR information for a 16×16 block is shown. For each block, the mean value and variance V16 is obtained (1110). The variance V16 is compared with the appropriate threshold T16 for the corresponding mean value (1115). If the variance V16 is not greater than threshold T16, the R value of the PQR data is set to 0 and the process ends (1120). Otherwise, the R value is set to 1 (1125). The variance V8 (i), {i=1 to 4} is then obtained for each of the four 8×8 sub-blocks 0 to 3 as shown in FIG. 9B and each variance V8 (i) is compared with the appropriate threshold T16 to determine the Q values for the PQR data (1130 to 1140). If a variance V8 (i) is not greater than threshold T8, the corresponding Q(i) is set to 0 (1145). Otherwise, the Q(i) value is set to 1 (1150). The variance $V_4(j)$, {j=1 to 4 }, is then obtained for each of the four 4×4 subblocks of each 8×8 block for which Q(i) is set to 1 and each variance $V_4(j)$ is compared with the appropriate threshold $T_4$ to determine the P values for the PQR data (1155 to 1165). If a variance $V_4(j)$ is not greater than threshold $T_4$, the corresponding Q(j) is set to 0 (1170). Otherwise, the Q(j) value is set to 1 (1175).

Thus, the PQR information may be generated and used for deblocking in image decompressor such as image decompressor 200. The PQR information is used to determine edge content in the image. The greater the edge information in a block, the smaller the block size and the longer the PQR code.

Figure 14:
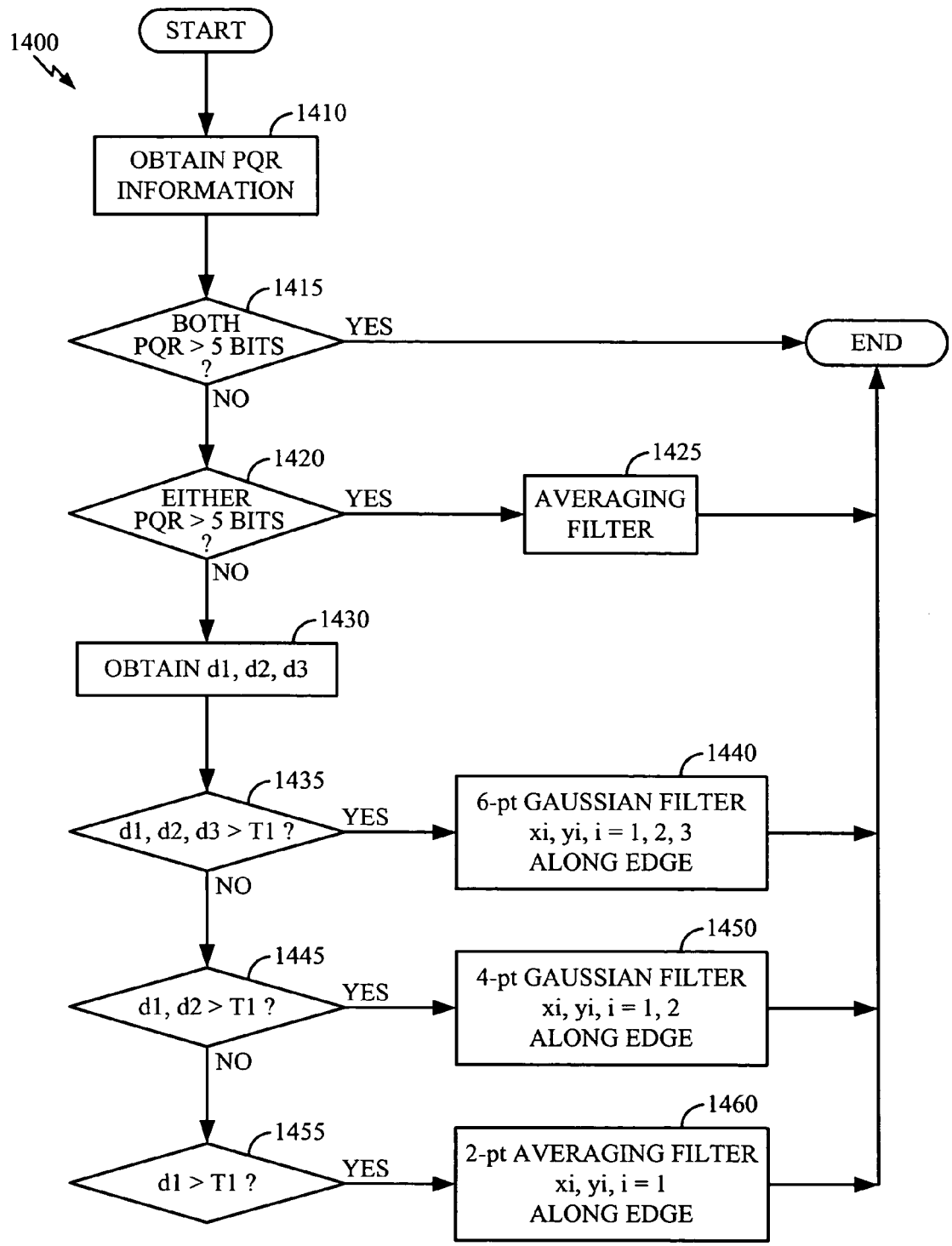
FIG. 14 shows an example process for determining whether to use deblocking filter in systems using ABSDCT.

FIG. 14 shows an example process 1400 for processing images compressed using ABSDCT and FIG. 13 shows the variable definition used in process 1400.

When determining whether deblocking filter is to be used for two neighboring blocks, the PQR information is obtained for each block (1410). If the PQR information for the two neighboring blocks is greater than 5 bits in length (1415), the process ends. Namely, both blocks are determined to be subdivided and deemed to contain sufficient edge information. Otherwise, if the PQR information for one of the neighboring blocks is greater than 5 bits in length, a two point averaging filter is used on {x1, y1} (1420 and 1425). If the PQR information for the two neighboring blocks is not greater than 5 bits in length, then difference values d1, d2 and d3 are obtained (1430). If d1, d2 and d3 are greater than threshold TD, then a 6 point Gaussian filter is used on {x1, x2, x3, y1, y2, y3}(1435 and 1440). If d1 and d2 are greater than threshold TD, then a 4point Gaussian filter is used on {x1, x2, y1, y2}(1445 and 1450). If d1 is greater than threshold TD, then a two point averaging filter is used on {x1, y1} (1455 and 1460).

In process 1400, the embodiment is not limited to an averaging filter and/or Gaussian filter. Various filters may be used other than the averaging filter and/or Gaussian.

As shown, a deblocking filter module can easily be implemented in a decompressor. Accordingly, artifacts may be significantly mitigated and the visual quality of an image is improved. Note that while deblocking filter module 240 is shown to be implemented separately from inverse VBSDCT module 230 and from processor 250, one or a combination of deblocking filter module 240, inverse VBSDCT module 230 and processor 250 may be implemented together.

Also, the embodiments may be implemented by hardware, software, firmware, middleware, microcode, or any combination thereof. When implemented in software, firmware, middleware or microcode, the elements of the embodiment are the program code or code segments to perform the necessary tasks may be stored in a machine readable medium (not shown). A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. Also, the machine readable medium may be implemented in an article of manufacture for use in a computer system and may have machine readable code means embodied in therein.

In addition, although the embodiments have been described using variable block size DCT, the deblocking technique as described above can also be implemented in DCT with fixed block sizes. In such cases, the BSA information would be generated, but would not used for actual DCT. Instead, the BSA information would be used at the image decompressor to determine whether deblocking is necessary for two neighboring blocks.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method of processing images compressed using block based compression, comprising:
   using a processor or computer to perform the steps of:
   determining whether two blocks of pixels are neighboring blocks;
   determining whether the two neighboring blocks are both subdivided, if it is determined that the two blocks are neighboring blocks;
   performing deblocking filtering on one or more edge pixels of the two neighboring blocks, after determining that at least one of the two neighboring blocks is not subdivided;
   using a first deblocking filter on one or more edge pixels of the two neighboring blocks if only one of the two neighboring blocks is subdivided;
   obtaining one or more difference values of one or more edge pixels of the two neighboring blocks, if neither of the two neighboring blocks is subdivided;
   comparing the one or more difference values to a second threshold;
   selecting a second deblocking filter based on the comparison of the one or more difference values to the second threshold; and
   using the second deblocking filter on one or more edge pixels of the two neighboring blocks if neither of the two neighboring blocks is subdivided.

2. The method of claim 1, wherein determining whether two neighboring blocks are both subdivided comprises:
   obtaining variance values of each of the two neighboring blocks;
   comparing the variance values to a first threshold; and
   determining whether the two neighboring blocks are both subdivided based upon the comparison of the variance values to the first threshold.

3. The method of claim 1, wherein determining whether two neighboring blocks are both subdivided comprises:
   obtaining a block size assignment value; and
   using the block size assignment value to determine whether the two neighboring values are subdivided.

4. The method of claim 1, wherein using the second deblocking filter comprises using a two point averaging filter on two edge pixels of the two neighboring blocks.

5. The method of claim 1, wherein the obtaining one or more difference values comprises obtaining a first order difference between edge pixels of the two neighboring blocks.

6. The method of claim 1, wherein the obtaining one or more difference values comprises obtaining a second order difference between edge pixels of the two neighboring blocks.

7. The method of claim 1, wherein obtaining one or more difference values comprises:
   obtaining difference values between three edge pixels of the two neighboring blocks; and wherein selecting the second deblocking filter comprises: using a Gaussian filter if at least two of the difference values are greater than the second threshold.

8. The method of claim 7, wherein using a Gaussian filter comprises using a six point Gaussian filter on six edge pixels of the two neighboring blocks, if the difference values are greater than the second threshold.

9. The method of claim 7, wherein using a Gaussian filter comprises using a four point Gaussian filter on four edge pixels of the two neighboring blocks, if two of the difference values are greater than the second threshold.

10. The method of claim 7, wherein selecting the second deblocking filter further comprises using an averaging filter on two edge pixels of the two neighboring blocks if one of the difference values is greater than the second threshold.

11. An apparatus to process images compressed using block based compression, comprising:
   means for determining whether two blocks of pixels are neighboring blocks;
   means for determining whether the two neighboring blocks are both subdivided, if it is determined that the two blocks are neighboring blocks;
   means for filtering one or more edge pixels of the two neighboring blocks, after determining that at least one of the two neighboring blocks is not subdivided;
   means for using a first deblocking filter on one or more edge pixels of the two neighboring blocks if only one of the two neighboring blocks is subdivided;
   means for obtaining one or more difference values of one or more edge pixels of the two neighboring blocks, if neither of the two neighboring blocks is subdivided;
   means for comparing the one or more difference values to a second threshold; and
   means for selecting a second deblocking filter based on the comparison of the one or more difference values to the second threshold; and
   means for using the second deblocking filter on one or more edge pixels of the two neighboring blocks if neither of the two neighboring blocks are subdivided,
   wherein the apparatus is a hardware apparatus.

12. The apparatus of claim 11, wherein the means for determining whether two neighboring blocks are both subdivided comprises:
   means for obtaining variance values of each of the two neighboring blocks;
   means for comparing the variance values to a first threshold; and
   means for determining whether the two neighboring blocks are both subdivided based upon the comparison of the variance values to the first threshold.

13. The apparatus of claim 11, wherein the means for determining whether two neighboring blocks are both subdivided comprises:
   means for obtaining a block size assignment value; and
   means for using the block size assignment value to determine whether the two neighboring values are subdivided.

14. The apparatus of claim 11, wherein the means for obtaining one or more difference values comprises:
   means for obtaining difference values between three edge pixels of the two neighboring blocks; and
   wherein the means for selecting the second deblocking filter comprises: means for using a Gaussian filter if at least two of the difference values are greater than the second threshold.

15. The apparatus of claim 14, wherein the means for using a Gaussian filter comprises means for using a six point Gaussian filter on six edge pixels of the two neighboring blocks, if the difference values are greater than the second threshold.

16. The apparatus of claim 14, wherein the means for using a Gaussian filter comprises means for using a four point Gaussian filter on four edge pixels of the two neighboring blocks, if two of the difference values are greater than the second threshold.

17. The apparatus of claim 14, wherein the means for selecting the second deblocking filter further comprises means for using an averaging filter on two edge pixels of the two neighboring blocks if one of the difference values is greater than the second threshold.

18. An apparatus to process images compressed using block based compression, comprising:
   a processor configured to determine whether two blocks of pixels are neighboring blocks and to determine whether the two neighboring blocks are subdivided if it is determined that the two blocks are neighboring blocks;
   a first deblocking filter configured to filter one or more edge pixels of the two neighboring blocks, after determining that at only one of the two neighboring blocks is subdivided; and
   a second deblocking filter configured to filter on one or more edge pixels of the two neighboring blocks after determining that neither of the two neighboring blocks are subdivided,
   wherein the processor is also configured to obtain one or more difference values of one or more edge pixels of the two neighboring blocks, if neither of the two neighboring blocks is subdivided, compare the one or more difference values to a second threshold, and select the second deblocking filter based on the comparison of the one or more difference values to the second threshold.

19. The apparatus of claim 18, wherein the processor determines whether two neighboring blocks are divided using block size assignment information.

20. The apparatus of claim 18, wherein the processor determines whether two neighboring blocks are divided based upon variance values of each block.

21. A method of processing images compressed using block based compression, the method comprising:
   using a processor or computer to perform the steps of:
   determining whether two neighboring blocks of pixels from an image are both subdivided;
   performing deblocking filtering on one or more edge pixels of the two neighboring blocks of pixels, after determining that at least one of the two neighboring blocks of pixels is not subdivided;
   determining one or more difference values between one or more corresponding edge pixels of the two neighboring blocks of pixels;
   when one of the one or more difference values exceeds a threshold value, filtering the edge pixels using an averaging filter; and
   when two or more of the one or more difference values exceeds the threshold value, filtering the edge pixels using a Gaussian filter,
   wherein the Gaussian filter comprises an N-point Gaussian filter, wherein N indicates two times a number of the one or more difference values that exceed the threshold value.

22. The method of claim 21, wherein determining whether two neighboring blocks are subdivided comprises:
   determining a size of a first block of pixels of the two neighboring blocks of pixels;
   determining a block variance based on pixels of the first block of pixels; and determining that the first block of pixels is subdivided when the block variance exceeds a threshold value associated with the determined size.

23. The method of claim 21, wherein determining whether two neighboring blocks of pixels from an image are subdivided comprises retrieving block size assignment information associated with a first block of pixels, wherein the block size assignment information indicates how the first block of pixels is subdivided.

24. The method of claim 21, further comprising:
when a first block of pixels of the two neighboring blocks of pixels is subdivided, selecting two neighboring sub-blocks of pixels;
determining whether the two neighboring sub-blocks of pixels are both subdivided; and
performing deblocking filtering on one or more edge pixels of the two neighboring sub-blocks of pixels, when it is determined that at least one of the two neighboring sub-blocks of pixels is not subdivided.

25. The method of claim 24, further comprising:
determining a size of a first sub-block of pixels of the two neighboring sub-blocks of pixels;
determining a sub-block variance based on pixels of the first sub-block of pixels;
determining that the first sub-block of pixels is subdivided when the sub-block variance exceeds a threshold value associated with the determined size.

26. The method of claim 21, further comprising:
obtaining one or more difference values of one or more edge pixels of the two neighboring blocks of pixels;
determining a number of the one or more difference values that exceed a threshold value; and
selecting a deblocking filter based on the number.

27. The method of claim 26, wherein selecting the deblocking filter comprises:
selecting a first deblocking filter when the number is equal to 1; and
selecting a second deblocking filter when the number is greater than 1.

28. A non-transitory machine-readable medium comprising code that when executed by a processor causes the processor to:
determine whether two blocks of pixels are neighboring blocks;
determine whether the two neighboring blocks are both subdivided, if it is determined that the two blocks are neighboring blocks;
perform deblocking filtering on one or more edge pixels of the two neighboring blocks, after determining that at least one of the two neighboring blocks is not subdivided;
output the filtered blocks to a display;
use a first deblocking filter on one or more edge pixels of the two neighboring blocks if only one of the two neighboring blocks is subdivided;
obtain one or more difference values of one or more edge pixels of the two neighboring blocks, if neither of the two neighboring blocks is subdivided;
compare the one or more difference values to a second threshold; and
select a second deblocking filter based on the comparison of the one or more difference values to the second threshold; and
use the second deblocking filter on one or more edge pixels of the two neighboring blocks if neither of the two neighboring blocks is subdivided.

29. The non-transitory machine-readable medium of claim 28, wherein code that causes the processor to determine whether two neighboring blocks are both subdivided comprises code to cause the processor to:
obtain variance values of each of the two neighboring blocks;
compare the variance values to a first threshold; and
determine whether the two neighboring blocks are both subdivided based upon the comparison of the variance values to the first threshold.

30. The non-transitory machine-readable medium of claim 28, wherein code to cause the processor to determine whether two neighboring blocks are both subdivided comprises code to cause the processor to:
obtain a block size assignment value; and
use the block size assignment value to determine whether the two neighboring values are subdivided.

31. The non-transitory machine-readable medium of claim 28, wherein code to cause the processor to use the second deblocking filter comprises code to cause the processor to use a two point averaging filter on two edge pixels of the two neighboring blocks.

32. The non-transitory machine-readable medium of claim 28, wherein code to cause the processor to obtain one or more difference values comprises code to cause the processor to obtain a first order difference between edge pixels of the two neighboring blocks.

33. The non-transitory machine-readable medium of claim 28, wherein the code to cause the processor to obtain one or more difference values comprises code to cause the processor to obtain a second order difference between edge pixels of the two neighboring blocks.

34. The non-transitory machine-readable medium of claim 28, wherein:
code to cause the processor to obtain one or more difference values comprises code to cause the processor to obtain difference values between three edge pixels of the two neighboring blocks; and
code to cause the processor to select the second deblocking filter comprises code to cause the processor to use a Gaussian filter if at least two of the difference values are greater than the second threshold.

35. The non-transitory machine-readable medium of claim 34, wherein code to cause the processor to use a Gaussian filter comprises code to cause the processor to use a six point Gaussian filter on six edge pixels of the two neighboring blocks, if the difference values are greater than the second threshold.

36. The non-transitory machine-readable medium of claim 34, wherein code to cause the processor to use a Gaussian filter comprises code to cause the processor to use a four point Gaussian filter on four edge pixels of the two neighboring blocks, if two of the difference values are greater than the second threshold.

37. The non-transitory machine-readable medium of claim 34, wherein code to cause the processor to select the second deblocking filter further comprises code to cause the processor to use an averaging filter on two edge pixels of the two neighboring blocks if one of the difference values is greater than the second threshold.

* * * * *